(No Model.)

D. E. KEMPSTER.
DIE FOR ROLLING ARTICLES OF METAL.

No. 385,186. Patented June 26, 1888.

Witnesses.
Henry Chadbourn
Herbert L. Chapin.

Inventor.
Daniel E. Kempster.

UNITED STATES PATENT OFFICE.

DANIEL E. KEMPSTER, OF BOSTON, MASSACHUSETTS.

DIE FOR ROLLING ARTICLES OF METAL.

SPECIFICATION forming part of Letters Patent No. 385,186, dated June 26, 1888.

Application filed February 8, 1888. Serial No. 263,360½. (No model.)

*To all whom it may concern:*

Be it known that I, DANIEL E. KEMPSTER, a citizen of the United States, residing at Boston, in the county of Suffolk and State of Massachusetts, have invented certain new and useful Improvements in Dies; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to dies for roll-forging metal blanks into articles of various longitudinal configuration, but having circular cross-sectional area; and my object is to provide dies which will impart superior qualities to the metal being worked, and also hasten the operation of forging.

My invention consists in constructing and arranging the forming, reducing, and spreading surfaces of the dies entirely within working-grooves running obliquely to the line of rotation of the metal article being rolled therein, or to the line of movement of said dies proper, whereby metal blanks when separated from the rod or bar and introduced between said dies will be bodily confined within said working-grooves, and there be obliquely acted upon while being rolled into the desired shape of the finished article.

In the drawings forming a part of this specification, Figure 1 is a plan view of two straight dies embodying my invention; Fig. 2, an end view of the same; Fig. 3, a side elevation of a conical bullet as rolled in said dies. Fig. 4 is a plan view of two curved dies; Fig. 5, an end view of the same; Fig. 6, a side elevation of a screw-blank as rolled in said dies. Fig. 7 is a plan or face view of two segmental dies; Fig. 8, a sectional view of the same on the line A B in Fig. 7; Fig. 9, an end view of Fig. 7; Fig. 10, a side elevation of a boiler-rivet as rolled in said dies. Fig. 11 is an end elevation of two conical or tapering roll-dies; Fig. 12, a section of the same on the line C D in Fig. 11; Fig. 13, a side elevation of a common round-head rivet as rolled in said dies. Fig. 14 is a side elevation of two roll-dies as in operation obliquely to each other; Fig. 15, an end elevation of the same; Fig. 16, a side elevation of a dumb-bell as rolled in said dies; Fig. 17, a side elevation or face view of one disk-die; Fig. 18, a cross-section of two of said disk-dies in working positions; Fig. 19, a side elevation of a hob-nail as rolled in said dies.

All of the above dies pertain to that class which are used in pairs in suitable machines designed to hold them with their working faces or grooves adjacent to each other, and between which the article to be rolled is rapidly revolved by their movement in opposite directions.

I have shown here some of the forms of dies to which I have applied my invention, and those skilled in the art to which it pertains will readily suggest other forms of dies to which it may be applied without departing from the essential spirit of my invention.

I need not herein describe the various machines for properly handling and operating the different kinds of dies shown and described by me, as it will be apparent to any intelligent mechanic on seeing the form and shape of said dies how to hold and move them properly to obtain the best result.

I need not herein minutely describe the precise shape of the working-groove in the faces of the different dies shown, as it is sufficient to state that the metal blank is severed from the rod or bar and enters bodily between the dies at the largest part of their groove, said dies at that time being in such position relative to each other as to cause said largest part of said grooves to register. The grooves are usually made tapering, and are milled or scored for about three-quarters of their length, commencing from their largest end. This insures the rough blanks revolving on entering said grooves and until formed and condensed nearly down to size, when it will continue to revolve and be smoothly finished to size by the remaining unmilled or unscored portions of said dies.

I do not desire to confine myself to any special or particular shape of working-groove in cross-section, as said grooves may be formed in the dies so as to diverge, reduce, and spread the metal stock of the blank wherever desired, which will be ever varied to correspond to the requirements of the shape of the article to be formed by rolling, it being understood that the metal blank severed from the rod or bar should contain just sufficient metal to fill the dies full in their smallest space when said metal is a fully condensed and finished article.

Referring to the drawings similar letters of reference indicate corresponding parts wherever they occur.

In Figs. 1 and 2, $a\ a$ are two straight dies, arranged face to face and adapted to be moved in a straight line in opposite directions in the usual manner. $a'\ a'$ are the working-grooves in said dies, formed to produce the bullet, Fig. 3, when a proper-sized piece of metal is rolled therein. The grooves $a'\ a'$ are formed in the dies obliquely to their line of movement. (Shown in Fig. 1 as a straight diagonal groove, although curved grooves may be substituted therefor if bearing the same or a similar relation to the line or plane of the line of motion of the dies proper, $a\ a$, as shown.)

In Figs. 4 and 5, $b\ b$ are two curved dies arranged face to face and adapted to be moved in opposite directions in a line coincident with their curve. $b'\ b'$ are the working-grooves formed obliquely in the side faces of said dies proper, or on a spiral or eccentric curve from the center of motion of the said dies, as shown in Fig. 4, although straight diagonal grooves may be substituted therefor and bear similar relation to the line of motion of said dies $b\ b$. The grooves $b'\ b'$ are cut to produce the screw-blank, Fig. 6, from metal rolled therein.

In Figs. 7, 8, and 9, $c\ c$ are two segmental dies, arranged face to face and adapted to be moved in opposite directions in an arc of a circle coincident with the radius of said dies. $c'\ c'$ are the working-grooves, formed obliquely or helically in the periphery of said dies proper, as shown in Fig. 7. Said grooves $c'\ c'$ are shaped to produce the boiler-rivet, Fig. 10, from a piece of metal rolled therein.

In Figs. 11 and 12, $d\ d$ are two conical-shaped or tapering roll-dies, arranged face to face and adapted to be revolved together in the same direction, thereby causing their working-faces to move in opposite directions past or by each other. $d'\ d'$ are the working-grooves formed obliquely or spirally in the faces of said die-rolls, as in the form of a screw-thread, (shown in Fig. 12,) and are shaped to produce the common round-head rivet, Fig. 13, from metal blanks rolled therein. The largest part of the grooves $d'\ d'$ is formed in that part of the rolls having the greatest diameter, as this gives more bearing-surface on the metal blank when entering and first being rolled in said grooves, and thus prevents said blank from slipping or rolling out of its proper central position. As the metal article is being rolled into shape, it is moved bodily lengthwise of said die-rolls, or parallel with a center line between their axes of rotation, being caused to bodily travel thus at an angle to the line or plane of the movement of the dies proper by the action of the opposing spiral grooves $d'\ d'$, which confine and both revolve and convey or carry the metal blank along from one end of said die-rolls to the other, where it is thrown out completed and finished to size. It is obvious that the said die-rolls may be made in the form of a sleeve or tube instead of solid, and for some certain kinds of work they would be preferably so made.

In Figs. 14 and 15, $e\ e$ are two die-rolls, arranged face to face, but obliquely to each other. They are adapted to revolve together in the same direction, thereby causing their adjacent and opposing faces to move by or past each other in opposite directions. $e'\ e'$ are the eccentric working-grooves, formed in line with their individual line or plane of movement, thereby differing in construction specifically with the other dies herein shown and described; but by arranging said die-rolls with their axes oblique to each other, as shown in Fig. 14, I am able to obtain that obliquely-drawing influence upon opposite sides of the article being rolled which is given to it by dies having their grooves formed obliquely to their line of motion, as before described, and for some kinds of work the dies $e\ e$ would be preferable. The grooves $e'\ e'$ are shaped to form the dumb-bell, Fig. 16, from metal blanks rolled therein.

In Figs. 17 and 18, $f f$ are disk-shaped dies adapted to be arranged side by side and revolved together in opposite directions. $f'f'$ are the working-grooves on the side faces of said dies, formed therein obliquely or eccentrically to the circle of their movement, similar to a scroll, and designed to face each other when in working position, as shown in Fig. 18. Said dies are represented as cut to produce the hob-nail, Fig. 19, from pieces of metal rolled therein. It is obvious that the said disk-dies may be made with beveled faces instead of flat, as shown, and for certain kinds of work may be preferable, and in either case the metal blank enters the die-groove at its largest part, which is preferably at the periphery, and is gradually rolled into shape as it is bodily carried within said groove toward the center of the disk, where it is thrown out completely rolled and finished.

The advantages I derive from constructing the working-grooves in the dies and arranging them to act in accordance with my invention—viz., so as to bodily confine and obliquely act upon the article being rolled—are, first, in rolling articles such as bullets, screw-blanks, various kinds of rivets, nails, &c., I am able to produce a superior class of work, as the oblique action of the dies upon the confined metal blank tends to force said metal endwise into that part of said die-grooves which forms the heads or points desired to be brought out full and sharp on the article being rolled; second, the oblique action of the dies upon the confined metal blank tends to condense and slightly twist the fibers of said metal blank, thereby closing up any seams or imperfections which may have existed in the rod or bar from which said blank was severed, and this produces a superior article, especially in a screw or nail, as the twist given the fibers effectually prevents their splitting when being driven; third, and, perhaps, the greatest advantage referred to is the fact that with my invention applied to revolving dies similar to those shown in Figs. 11, 12, 17, and 18 I am able to greatly increase the production of small metal articles over and above any machine or method now employed in the manufacture of similar work.

The above fact is accomplished by the oblique die-grooves confining and carrying the articles being rolled bodily along out of the way of each other, thereby permitting the dies to be continuously revolved at a very high rate of speed, as I do not have to depend upon gravity to carry the finished articles out of the dies and away from each other, as heretofore. My improved die-grooves, when revolved rapidly, as described, are capable of receiving a continuous stream of metal blanks in one end of said grooves, and will roll to size and pass them out the opposite end without clogging. It will therefore be obvious that while I have shown several forms of reciprocating dies constructed in accordance with my invention I prefer in the manufacture of small articles to use dies continuously rotary, and special forms of them, and also machines for operating them, will form subject-matter for several future applications for Letters Patent.

The reciprocating dies herein shown are better adapted for a heavier class of work than is shown on the drawings. The die-grooves shown in Fig. 4 is a preferred form of construction, and may be used upon the rotary dies, Figs. 12 and 18. Said groove is tapering two ways, so as to take in a large but short piece of metal, and then reduce its diameter, but extend its length, as will be fully understood by referring to the drawings. All the metal blanks shown within the dies are marked $x$, and all the milled or scored surfaces of said dies are marked $z$.

In rotary dies as heretofore constructed, having their working-grooves in line with the line or plane of their rotation, the articles being rolled leave said dies by gravity alone, and a new blank cannot enter said dies until the one last rolled drops out. This is obviously slow as compared with my improvements, as herein described and shown.

Rolling metal circular between die-faces moving in opposite directions and rolling screw-threads into cylindrical surfaces by spiral projections on said die-faces are both old and well known in the art; but I believe myself to be the first to make and use the invention herein described and claimed.

What I desire to claim is—

Dies for roll-forging metal articles having circular cross-sectional area from metal blanks separated from the main rod or bar, said dies having their forming, reducing, and spreading surfaces entirely within working-grooves running obliquely to the line of rotation of the metal article being rolled therein, or to the line of movement of the dies proper, substantially as herein specified, and for the purpose set forth.

In testimony whereof I affix my signature in presence of two witnesses.

DANIEL E. KEMPSTER.

Witnesses:
HENRY CHADBOURN,
OSBORNE R. PERRY.